(12) United States Patent
Liret et al.

(10) Patent No.: US 11,520,627 B2
(45) Date of Patent: Dec. 6, 2022

(54) RISK-AWARE VIRTUAL MACHINE SCHEDULING

(71) Applicant: BRITISH TELECOMMUNICATIONS PUBLIC LIMITED COMPANY, London (GB)

(72) Inventors: Anne Liret, London (GB); Carla Cairano-Gilfedder, London (GB); Mathias Kern, London (GB); Chenlu Ji, London (GB); Raphael Dorne, London (GB); Rupal Mandania, London (GB); Jiyin Liu, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/310,838

(22) PCT Filed: Feb. 28, 2020

(86) PCT No.: PCT/EP2020/055368
§ 371 (c)(1),
(2) Date: Aug. 26, 2021

(87) PCT Pub. No.: WO2020/178207
PCT Pub. Date: Sep. 10, 2020

(65) Prior Publication Data
US 2022/0043677 A1    Feb. 10, 2022

(30) Foreign Application Priority Data
Mar. 3, 2019    (EP) ..................................... 19160426

(51) Int. Cl.
*G06F 9/48*    (2006.01)
*G06F 9/455*    (2018.01)
(Continued)

(52) U.S. Cl.
CPC ........ *G06F 9/4887* (2013.01); *G06F 9/45558* (2013.01); *G06F 11/301* (2013.01); *G06F 11/3452* (2013.01); *G06F 2009/45591* (2013.01)

(58) Field of Classification Search
None
See application file for complete search history.

(56) References Cited

U.S. PATENT DOCUMENTS 8,291,411 B2 * 10/2012 Beaty ..................... G06Q 10/04
                                                                                    718/1
8,701,107 B2 *  4/2014 Gulati .................. H04L 67/104
                                                                                    718/1
(Continued)

FOREIGN PATENT DOCUMENTS

WO    WO-2017000628 A1    1/2017

OTHER PUBLICATIONS

Combined Search and Examination Report for Great Britain Application No. 1902853.9, dated Aug. 29, 2019, pages.
(Continued)

*Primary Examiner* — Van H Nguyen
(74) *Attorney, Agent, or Firm* — Patterson Thuente IP

(57) ABSTRACT

A computer implemented method of scheduling a plurality of virtual machines for execution by a physical computing infrastructure is described. The plurality of virtual machines are deployable to a subset of the physical computing infrastructure to execute a computing task. The method includes determining a subset of the infrastructure and a time period for deployment of each virtual machine, so that the virtual machines are scheduled to execute to completion over an aggregate of all time periods. The determination is based on a mathematical optimization of a risk function for each of the plurality virtual machines that corresponds to a relative
(Continued)

risk that at least one virtual machine will fail to fully execute its task to completion.

4 Claims, 11 Drawing Sheets

(51) Int. Cl.
  G06F 11/30 (2006.01)
  G06F 11/34 (2006.01)

(56) References Cited

U.S. PATENT DOCUMENTS

| | | | | |
|---|---|---|---|---|
| 8,762,525 | B2* | 6/2014 | Devarakonda | G06F 9/5072 709/224 |
| 8,966,084 | B2* | 2/2015 | Dow | G06F 9/06 709/226 |
| 9,210,141 | B2* | 12/2015 | Anderson | G06F 21/31 |
| 9,483,299 | B2* | 11/2016 | Sivasubramanian | G06F 11/30 |
| 9,811,435 | B2* | 11/2017 | Babakhan | H04L 63/20 |
| 9,983,900 | B2* | 5/2018 | Sivasubramanian | G06F 11/301 |
| 10,289,440 | B2* | 5/2019 | Sivasubramanian | G06F 11/301 |
| 10,296,364 | B2* | 5/2019 | Sivasubramanian | G06F 11/3452 |
| 10,402,293 | B2* | 9/2019 | Babakhan | H04L 63/20 |
| 10,698,713 | B2* | 6/2020 | Tsirkin | G06F 9/45558 |
| 10,896,055 | B2* | 1/2021 | Sivasubramanian | G06F 9/5077 |
| 2013/0111470 | A1 | 5/2013 | Bozek et al. | |
| 2013/0238780 | A1 | 9/2013 | Devarakonda et al. | |
| 2017/0046190 | A1 | 2/2017 | Sivasubramanian et al. | |

OTHER PUBLICATIONS

Dorene R., et al., "—an Optimisation Tool-kit Based on Heuristic Search to Solve BT Scheduling problems," Bt Technology Journal, Oct. 2013, vol. 21, No. 4, 10.1023/A:1027375302779, pp. 50-58.

Extended European Search Report for Application No. 19160426.3, dated Jun. 24, 2019, 7 pages.

International Search Report and Written Opinion for Application No. PCT/EP2020/055368, dated Apr. 7, 2020, 11 pages.

Liu L., et al., "A Survey on Virtual Machine Scheduling in Cloud Computing," 2016 2nd IEEE International Conference on Computerand Communications, pp. 2717-2121.

Salot P., "A Survey of Various Scheduling Algorithm in Cloud Computing Environment," International Journal of Research in Engineering and Technology (IJRET), Feb. 2013, vol. 2, Issue: 2, ISSN: 2319-1163, pp. 131-135.

* cited by examiner

RISK-AWARE VIRTUAL MACHINE SCHEDULING

PRIORITY CLAIM

The present application is a National Phase entry of PCT Application No. PCT/EP2020/055368, filed Feb. 28, 2020, which claims priority from EP Patent Application No. 19160426.3, filed Mar. 3, 2019, each of which is hereby fully incorporated herein by reference.

FIELD

The present disclosure relates generally to scheduling of virtual machines in a physical computing infrastructure.

BACKGROUND

Virtual machines (VMs) are virtualized computing components that execute with physical hardware to provide virtual computer systems. VMs are dynamically deployable such that a VM can be instantiated for execution of tasks such as software operations at runtime. Further, VMs can be terminated on completion of tasks to free-up infrastructure resources for redeployment to other VMs.

The efficient use of physical computing infrastructure across potentially multiple dynamically created and completing VMs is important to avoid excessive resource consumption. To balance this, it is necessary that sufficient infrastructure resource is available for all deployed VMs such that a failure of an operation executing in a VM does not arise as a result of, for example, insufficient physical resource, excessive resource sharing, insufficient performance and/or an inability to complete a task execution in a required timeframe.

Thus, there is a challenge in scheduling VMs to physical computing infrastructure to provide efficient and effective completion of tasks executed by VMs.

SUMMARY

According to a first aspect of the present disclosure, there is a provided a computer implemented method of scheduling a plurality of virtual machines for execution by a physical computing infrastructure with each virtual machine being deployable to a subset of the physical computing infrastructure to execute a computing task. The method can include determining, for each virtual machine, a subset of the physical computing infrastructure and a time period for deployment of the virtual machine, so as to schedule the plurality of virtual machines to execute to completion over an aggregate of all time periods, wherein the determination is based on a mathematical optimization of a risk function for each of the plurality of virtual machines corresponding to a relative risk that at least one virtual machine will fail to fully execute its task to completion.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF DRAWINGS

Embodiments of the present disclosure will now be described, by way of example only, with reference to the accompanying drawings, in which.

DETAILED DESCRIPTION

Figure 1:
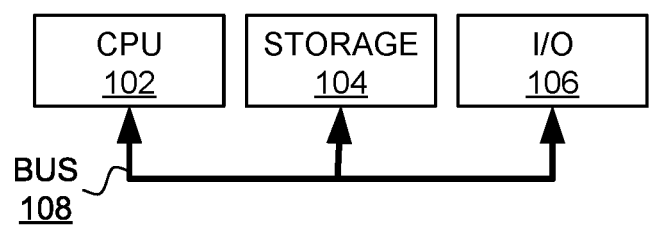
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Embodiments of the present disclosure provide risk-aware heuristics methods to support real-time dynamic allocation of tasks to virtual machine (VM) slots of physical computing infrastructure resources. The mechanism introduces a risk-dependent element to a scheduler's core optimizer. This element calculates, in one embodiment, an aggregated risk from weighted risk estimates of scheduled tasks alongside other potentially other scheduling costs. A risk assessment function can automatically update and propagate risk into the future when a task's expectation and/or physical resources change and if necessary trigger re-optimization.

A data center (DC) or server farm is a cluster of potentially many computer systems such as servers forming, for example, an organization's internal IT infrastructure and/or external IT-based services such as cloud services. They are typically host commodity hardware and software as physical computing infrastructure including, inter alia, servers, top-of-rack and aggregation switches, routers, load balancers and middleware. Cloud computing services require a combination of multiple resources such as link bandwidth and IT (CPU, I/O bandwidth etc.).

Figure 2:
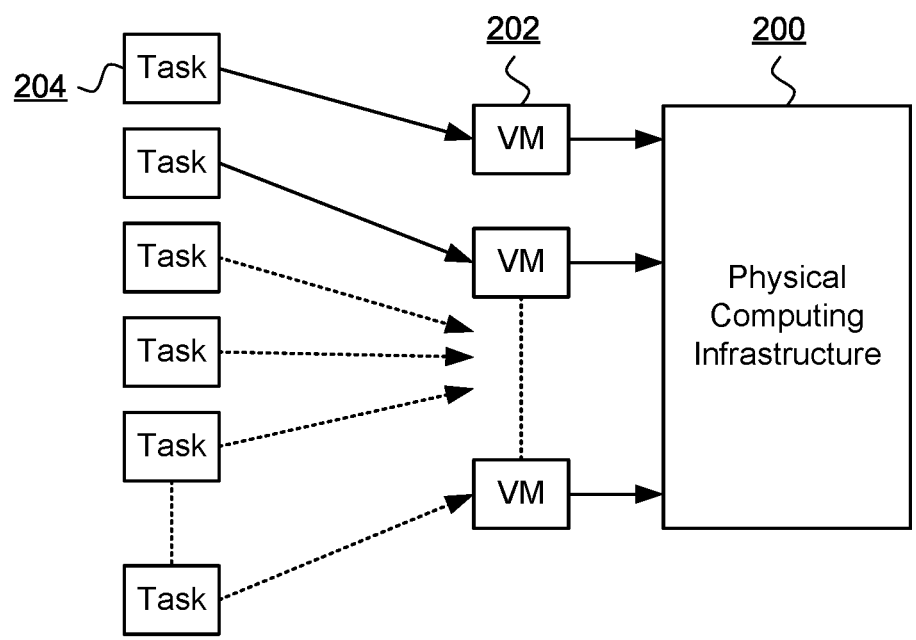
FIG. 2 is a component diagram of an arrangement for scheduling virtual machines for use with physical computing infrastructure according to an embodiment of the present disclosure.
Figure 3:
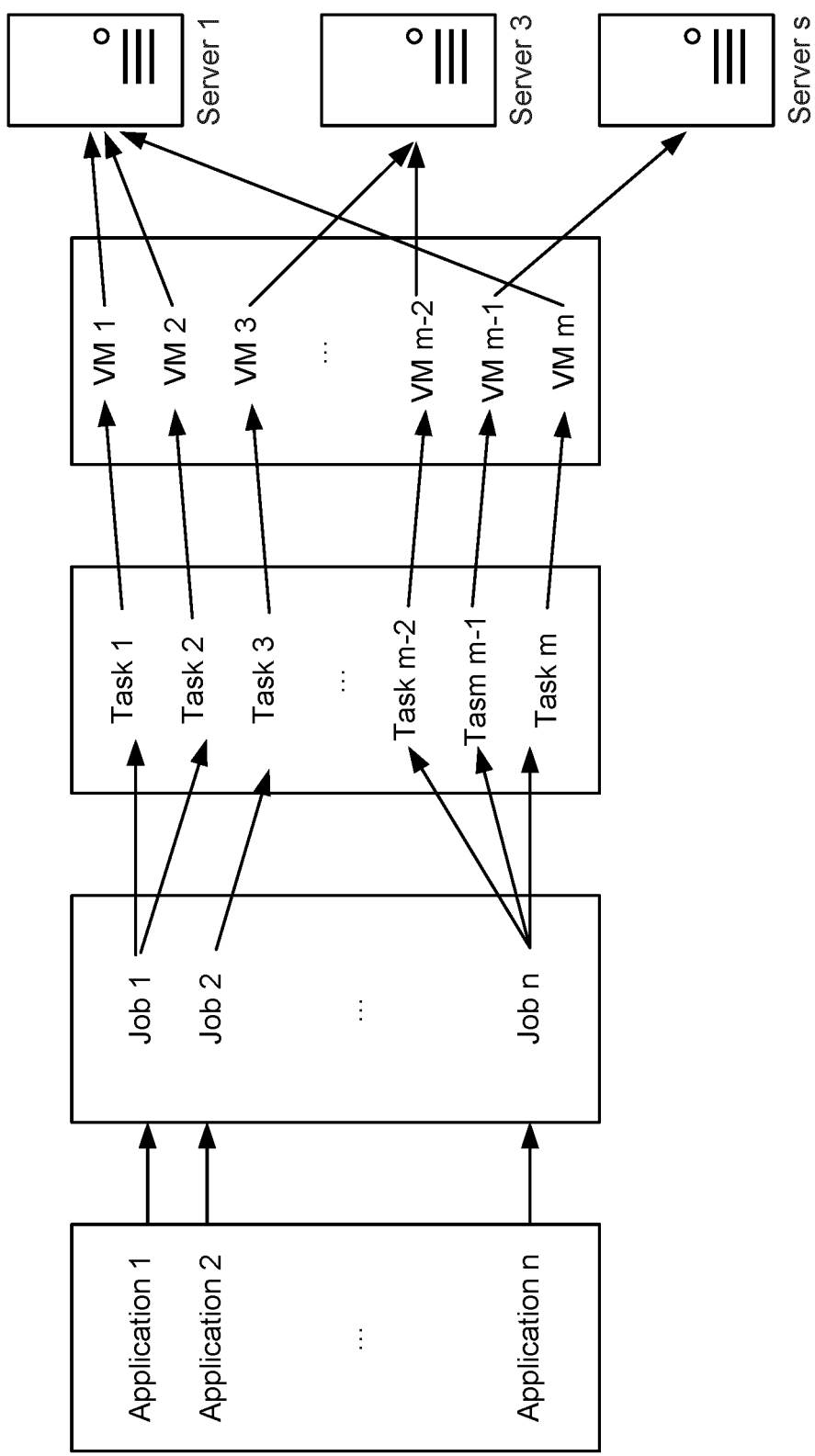
FIG. 3 depicts an exemplary virtual machine scheduling arrangement according to embodiments of the present disclosure.

FIG. 2 is a component diagram of an arrangement for scheduling virtual machines for use with physical computing infrastructure according to an embodiment of the present disclosure. A set of computing tasks 204 such as execution of software application(s), software batch processes, real-time software processes or the like, are undertaken by way of deployment of VMs 202 using physical computing infrastructure 200. The physical computing infrastructure 200 can be provided by, for example, DCs and constitutes a physical platform which provides resources for cloud computing services for the execution of applications. Each application is performed through jobs constituted as one or more tasks that are executed by means of VMs which are deployed using DC physical resources (e.g. CPU, I/O, network links). Such an arrangement is depicted, for example, in FIG. 3. Due to the intrinsically variable and multi-tenant nature of cloud services, it is challenging for a cloud computing provider to estimate, at a given time, physical resource availability and an expected performance for a particular application, job and/or task. Where volatility increases the risks of unmanaged peak-demand and service performance degradation also increases.

A distinguishing feature of DC workload is that a fraction of DC workload is flexible, that is it can be re-scheduled. Hence a cloud provider can derive benefits from optimizing workload time scheduling to VMs throughout a period of time, managing peak-demand and minimizing risks of service degradation. Embodiments of the present disclosure provide a risk-aware meta-heuristics methodology which reduces a risk of service degradation and balances other objectives, complementing the function of a main optimizer performing real-time dynamic scheduling of tasks to DC's physical resources VM time slots.

Thus, embodiments of the present disclosure provide a risk-aware element which operates within a scheduler's optimizer for calculating a cumulative risk from weighted risk estimates for each of a plurality of scheduled (or to be scheduled) tasks. Other parameters in a scheduling objective function can also be taken into account, such as minimizing a number of unallocated tasks, optimizing a utilization of physical resources according to energy saving objectives, and/or minimizing a lead time for tasks across a scheduling time period.

An iterative risk assessment function automatically updates and propagates risk for tasks for execution by VMs in time slots into the future. In the event of a change to a task duration—deviating from an expectation—or a change to physical resource utilization, a rescheduling (by re-allocation) of tasks to VMs and physical infrastructure can be performed.

A VM can be characterized by two main characteristics:
1) A time duration (i.e. a length of time a VM consumes physical resources); and
2) A magnitude (i.e. an amount of physical resources consumed, e.g. CPU, RAM, I/O, Bandwidth). The magnitude of physical resources assigned to a VM is not considered to impact the time's completion of jobs, provided resources are greater than a minimum amount.

Heuristics employed in embodiments of the present disclosure operate on a time dimension for VMs, assuming that execution of certain tasks can be delayed. A further dimension for VMs is a magnitude of physical resources utilized and can be modeled through a risk of task failure due to lack of resources.

A DC's resources and workload planning functions need to cater for task requests in real-time by assigning tasks to VMs on available physical resources. Additionally, it is necessary to make provision for future demand and this can be achieved by monitoring DC utilization and workload forecasts (which predict expected tasks over time) and ensuring adequate future resource provisioning.

DC workload is subject to variability arising from, for example:
1) Tasks that may start later than expected (for instance caused by variation in network delay);
2) Tasks that may finish later than expected (for instance due to task processing time variation or resource responsiveness degradation); and/or
3) Tasks that are unable to complete, for example due to a lack of resources.

In order to restrict the impact of such uncertainty on service quality, embodiments of the present disclosure introduce real-time risk-aware optimization of task scheduling to VM slots deployable to available physical resources.

Embodiments of the present disclosure thus provide:
1) A risk model: a likelihood of service performance degradation is modeled according to the above 3 variability reasons, in the form of a function; Risk=Likelihood×Impact (likelihood of events in relation to task and resources times their impact).
2) De-risk approach: allocation of tasks to VM slots incorporates this risk function into the scheduling optimization process by means of:
  modeling of risk factors and dynamic real-time risk evaluation, when considering the allocation of tasks to VM slots;
  modeling, with a distribution function, the uncertainty in tasks (i.e. above 3 factors);
  modeling the ability to complete each task by the physical infrastructure by monitoring real-time resource utilization and mapping this to a prospect of resources having sufficient capacity to be able to complete a task; and
  propagating dynamic risk over a sequence of scheduled tasks over a given future scheduling horizon (e.g. 24 hour).

Figure 4:
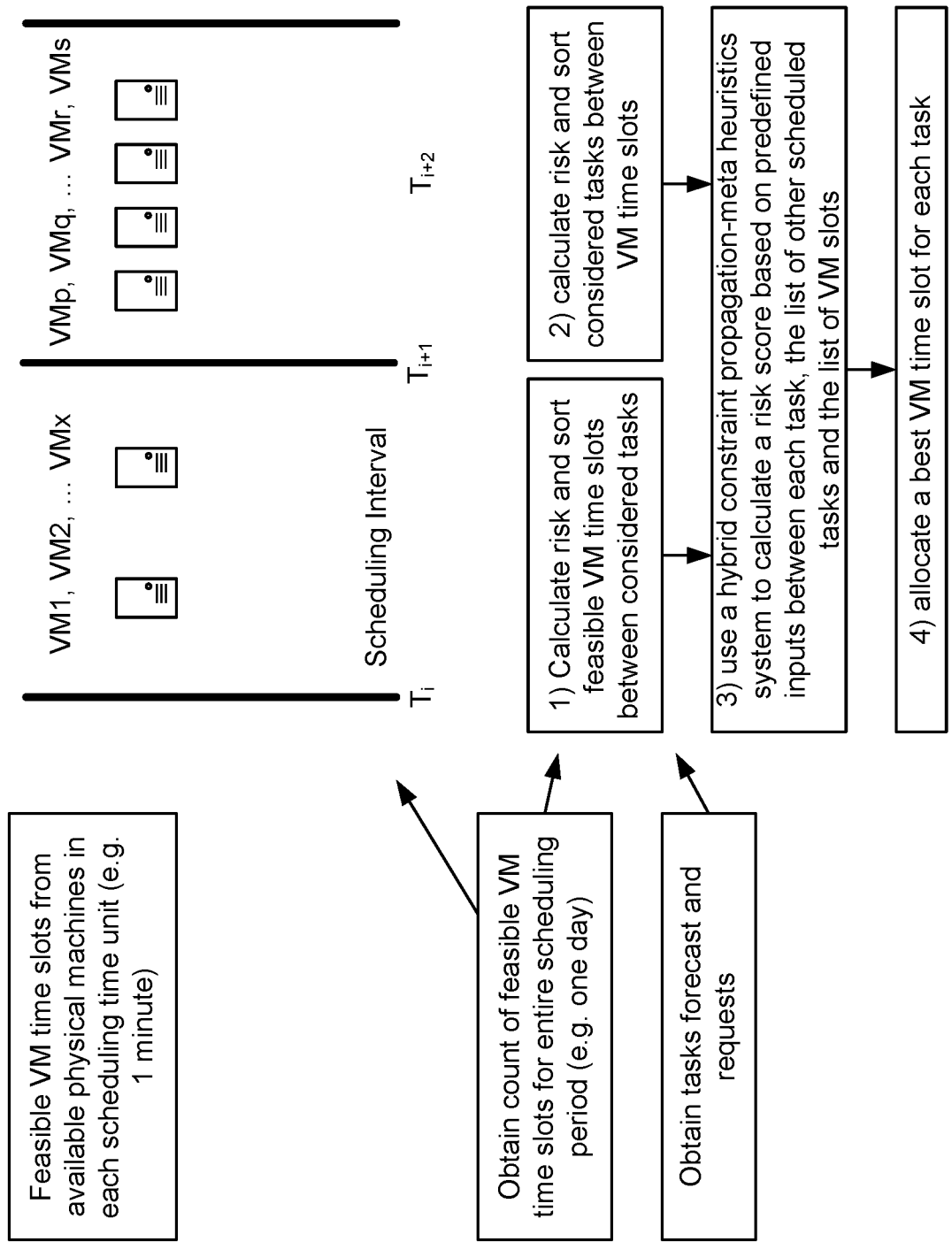
FIG. 4 illustrates a virtual machine scheduling process according to embodiments of the present disclosure.

In a preferred embodiment, de-risking employs a novel heuristics-search method which combines swap and insertion of tasks to a VM slot schedule and computes a neighborhood according to a risk of already scheduled tasks and remaining feasible slots for unallocated tasks (see FIG. 4).

Some embodiments of the present disclosure provide benefits such as:
  Risk is used to build a more robust Start-Of-Day DC VM slot allocation plan, in each time unit (e.g. 1 minute);
  Risk is used in real-time and may be calculated on-demand, reacting to all or only specific events, to derive DC VM slots requirements and trigger their actual instantiation/provisioning; and
  The mechanism enables DC task workload scheduling to VM slots with explicit objective of minimizing the impact of uncertainty of events.

Some embodiments of the present disclosure provide output including:
1) A task/VM schedule up to the end of a scheduling horizon (e.g. end-of-day): (re)-allocation of task to VM slots;
2) Triggering of (re-)instantiation of required VMs physical resources (IT or network) for tasks that require immediate execution;
3) Deploying VMs by provisioning/commissioning of VMs physical resources (IT or network) for tasks that require future execution.

Embodiments of the present disclosure undertake risk calculation using constraints propagation as a risk assessment method at a task level, where each task has an expected start time. This can be modeled through three main features of the system for tasks:

1) Task start time;
2) Task latest end-time; and
3) Task magnitude (which is a set of quantitative features requirements that assigned resources need to meet during a processing period of a task).

Figure 5:
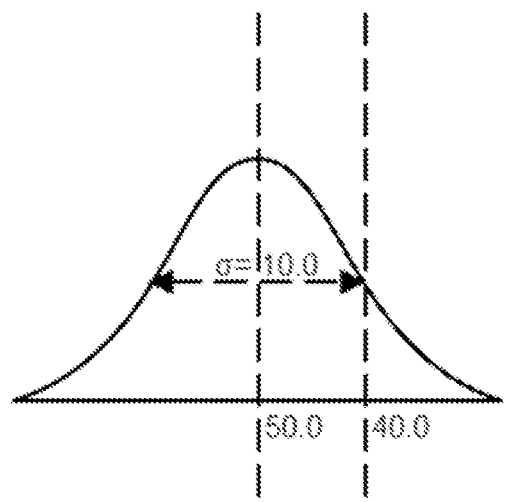
FIG. 5 depicts a timing distribution for a task in an exemplary embodiment.

Thus, some embodiments of the present disclosure assess each task allocation risk at the following 3 levels:

1) Beyond processing (start) target (e.g. distributed normally as illustrated in FIG. 5);
2) Beyond end of time window when task is expected to be completed (e.g. distributed normally illustrated in FIG. 5); and
3) Demand exceeding available resources.

In embodiments of the present disclosure, the model is based on a set of constraint objects, where each task is modeled with an invariants function of previous tasks in the schedule, task precedence and parallel relations, and task splitting over multiple time slots. An invariant is a type of functional constraint that is composed of a set of inputs, an output and a function that calculates the output when the inputs are valued. The root input of the network is a first task variable. The scheduler estimates, through such a function, the task start/end times and a risk function for all tasks resulting from a task allocation when associating (scheduling) a task and its associated VM to a time slot and physical resource. Objectives of the scheduler include reducing (preferably minimizing) a sum of risk for every task in the schedule. Task variables include an earliest start time, latest start time, earliest end time, and latest end time of the task (see FIGS. 6 and 7). These variables are influenced by previous tasks in the schedule, the resource and a time slot the task is scheduled to.

A resource can be represented as a tuple [Physical Server, TimeSlot]. When a new task arrives, likelihood and impact for each pair (Ri, TSj) are assessed, where Rj is resource j and TSj is time-slot j. Given a schedule S composed of a set of resources {Resources} and a set of tasks {Tasks}, an objective is to minimize an objective function with 3 components with priority being driven by weights. These three components are:

1) Overall risk;
2) Failure of service (i.e. failure of a suitable completion time); and
3) Resource utilization (aiming to use fewer resources possible).

When building a schedule S, an overall objective can be to minimize the following weighted function $$W_{risk} \times Risk(S) \quad \text{(equation 1)}$$
$$+ W_{qos} \times FailureOfServiceCompletion(S)$$
$$+ W_{operational} \times ResourceCost(S)$$

where FailureOfServiceCompletion(S) is the is the quantitative representation of the cost of having tasks in S that are scheduled to finish or start after their commitment target, and ResourceCost(S) is the quantitative representation of the cost of using a physical resource in S. Further, $$Risk(S) = \Sigma_{r \text{ in } \{Resources\}} \Sigma_{t \text{ in } \{Tasks\}} Risk(t,r,S) \quad \text{(equation 2)}$$

with Risk(t,r,S) being a function of task and resource defined as the product between the likelihood of failure of resource r to process successfully task t and the impact that this failure would have on the overall quality of service for this task t. Given schedule S, this risk can be defined for a given task t and resource r as:

$$Risk(t,r,S) = likelihoodOfFailure(t,r,S) \times impact(t) \quad \text{(equation 3)}$$

where impact is a function of a criticality of a job request and, as failure can happen for various reasons, the LikelihoodOfFailure(t,r,S) is defined as a likelihood of failure along a time dimension because of processing/duration variability (LikelihoodTime), because of network delay variability (LikelihoodNetwork) as well as along the magnitude dimension (LikelihoodMagnitude).

Thus, given schedule S and resource ri, task tj:

$$LikelihoodTime(ri,tj,S) = P_{start}(ri,tj,S) + P_{target}(ri,tj,S) \quad 1.$$

$$LikelihoodNetwork(ri,tj,S) = \Sigma_{tj \text{ in } S} P_{network}(ri,tj,S) \quad 2.$$

and a likelihood of not having sufficient resource meeting the asked performance features:

$$LikelihoodMagnitude(ri,tj,S) = \Sigma_{tj \text{ in } \{Tasks\}} P_{magnitude}(ri,tj,S) \quad 3.$$

where:

$P_{start}(t,r,S)$ is a probability of task t not starting on a server within its VM slot (due to task duration changes and/or network delay variability);

$P_{target}(t,r,S)$ is a probability of task t not being completed on a certain day before a target time given schedule S (due to task duration changes and/or network delay variability);

$P_{network}(t,r,S)$ is a probability of having a network delay variability above or up to an acceptable criteria; and $P_{magnitude}(t,r,S)$ is a probability of task t failing the instantiation to a VM slot by its target due to magnitude requirement.

Figure 6:
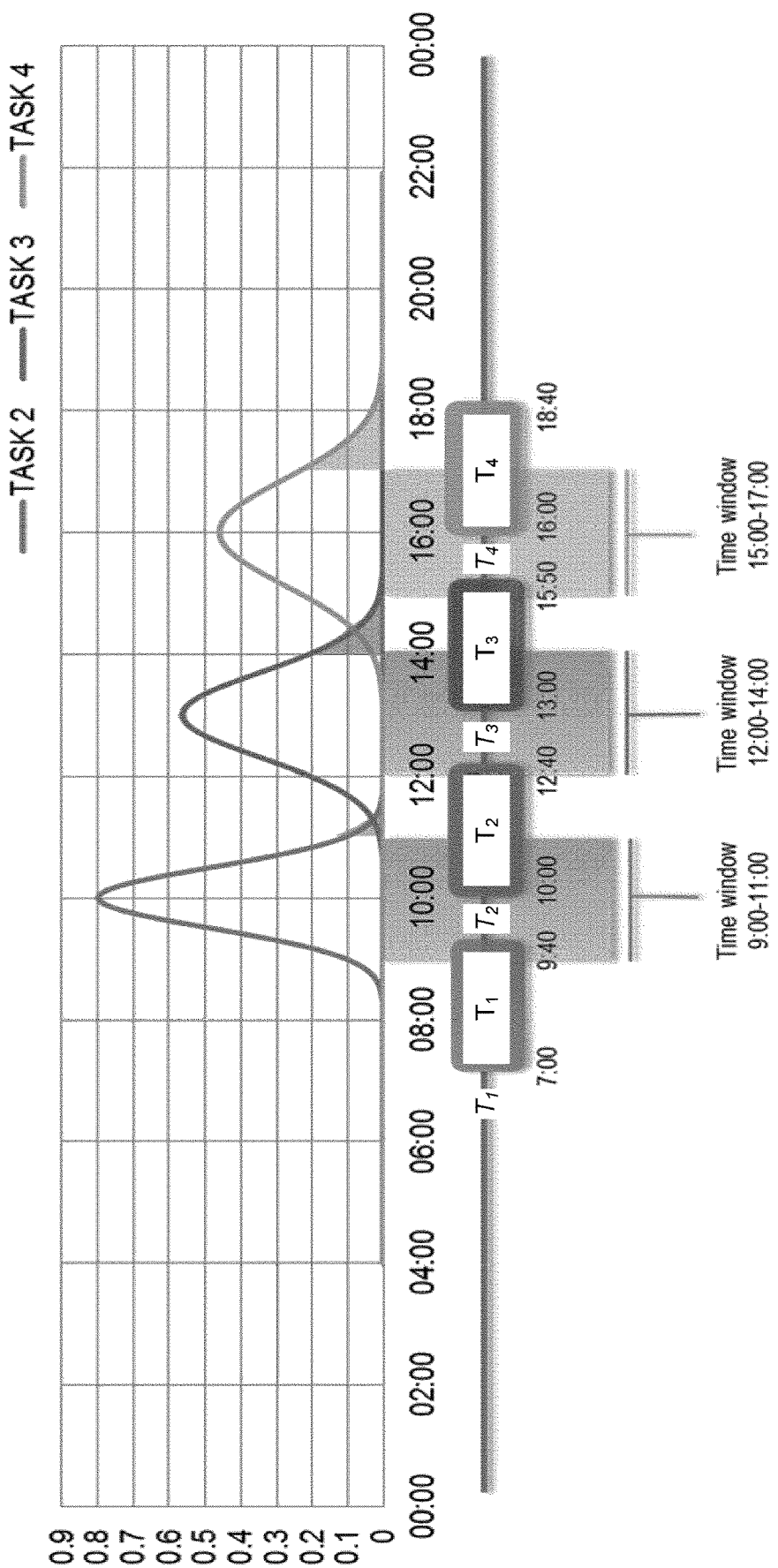
FIG. 6 depicts timing distributions for a plurality of tasks in an exemplary embodiment.

A risk of given VM slots, reserved for task ti, going un-allocated is the probability of the task arrival time being later than the time window (refer to the shaded part of the normal distributions in FIG. 6). The stochasticity of a task arrival time is due to its random nature and uncertainty about task duration and network delay.

A task's VM time slot duration is modeled as a distribution learned over time (e.g. normal distribution) and may be described by means of:

mean=default duration standard deviation=$X$ %×mean

Task allocation can be seen as a sequence of independent such distributions. A task scheduling engine computes in real-time earliest/latest start/end times (as depicted in FIG. 7) of all expected tasks based on their respective duration distributions, then sums up all the risk to obtain the overall risk Risk(t,r,S) which it then aims to minimize through re-allocation of tasks to [resource, timeslots] through equation (1).

Figure 7:
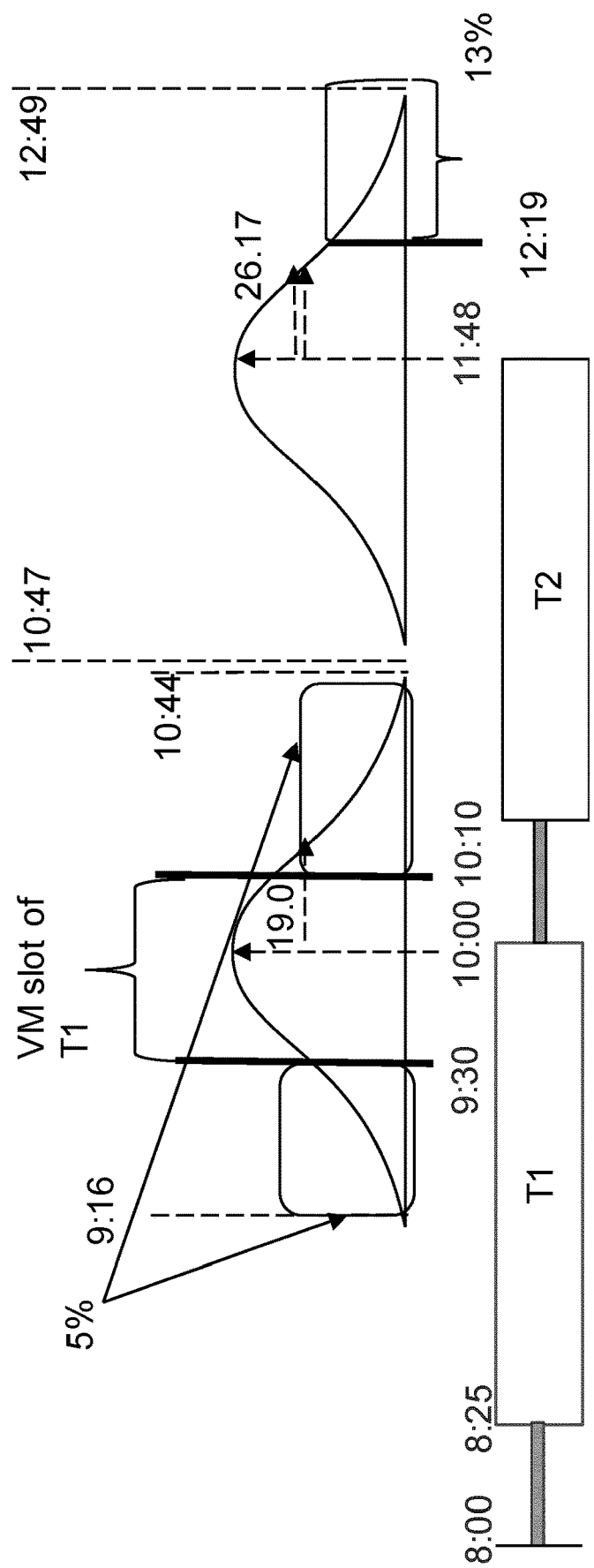
FIG. 7 depicts timing distributions for a plurality of tasks in an exemplary embodiment.

For example, in the example of FIG. 7, an end time of T1 is represented by a distribution starting from 9:16, with a mean value at 10:00 (the mean point in a normal is equal to the end time that would be obtained without a risk model) and with a latest value at 10:44. The end time of T2 is represented by a distribution starting from 10:47, with a mean value at 11:48 and with a latest value at 12:49. It can be seen that the T1 duration distribution is influencing the distribution of start times for T2 and the end times for T2; thus T2 duration distribution and the T2 start times distribution are added (the start times distribution being, itself, a function of the T1 distribution).

Task variability in start and end time as modeled through such distributions are iteratively accumulated taking into account previously scheduled tasks. Task start time and end time are influenced by a task processing time and an end time of previous tasks in the schedule. FIGS. 6 and 7 illustrate how a probability of task start/end time is propagated over the schedule. The model defines function $f_{start}$ and $f_{end}$ which are the distributions of task start and end time.

$$f_{start}(ri,tj,S)=Fa(f_{start}(ri,tj-1,S),tj) \text{ where } j>=1 \text{ and}$$
$$f_{start}(ri,t0,S)=a\text{Constant}$$

$$f_{end}(ri,tj,S)=Fa(f_{end}(ri,tj-1,S),tj) \text{ where } j>=1 \text{ and } f_{end}(ri,t0,S)=a\text{Constant}$$

where Fa is the function which recursively aggregates the probability on tj time, where task tj is inserted in schedule S, from twofold inputs: 1) a probability of previous task tj−1 end time; and 2) the probability of tj processing time.

Probability of failure for task ti is then a function—called Pc here—returning a portion of a distribution of tj start or end time or tj's network transfer duration or tj's magnitude requirement match, that overlaps the failure criteria (beyond target, out of VM slot, exceeding available resources):

$$P_{start}(ri,tj,S)=Pc(f_{start}(ri,tj,S), VMj) \text{ where } j>=0$$

$$P_{target}(ri,tj,S)=Pc(f_{target}(ri,tj,S), target(tj)) \text{ where } j>=0$$

In case of Network delay and Magnitude probability, there is a likelihood components are summing up the probability of excessive network delay, or magnitude requirement failure over the tasks in {Tasks}. The model defines function $f_{network}$ which is a distribution of network transfer times over the network path between a job request machine and a physical resource, and $f_{magnitude}$ which is an amount of resource likely to be available after task consumption (i.e. VM instantiation).

$$f_{network}(ri,tj,S)=Fa(f_{network}(ri,tj-1,TSi, S), tj) \text{ where } j>=1 \text{ and } f_{network}(ri,t0,TSi, S)=a\text{Constant}$$

$$P_{network}(ri,tj,S)=Pc(f_{network}(ri,tj,S)) \text{ where } j>=0$$

$$f_{magnitude}(ri,tj,S)=Fa(f_{magnitude}(ri,tj-1,TSi, S),tj), j>=1$$
$$\text{and } f_{magnitude}(ri, t0,TSi,S)=a\text{Constant}$$

$$P_{magnitude}(ri,tj,S)=Pc(f_{magnitude}(ri,tj,S)) \text{ where } j>=0$$

FIG. 7 provides an example of theses variables for a sequence of 2 scheduled tasks to the same resource, T1 and T2. Earliest start and latest start times are themselves functions of the task processing time.

In FIG. 7: T2.earliestStartTime=$F_{start}$(T1.earliestEndTime, T2.startTimeDistribution, T2.timeslot, R), where $F_{start}$ is the function calculating recursively the start time distribution of each scheduled task, from the distribution of previous task in schedule.

Similarly,

T2.latestStartTime=$F_{start}$(T1.latestEndTime, T2.startTimeDistribution, T2.timeslot, R)

T2.earliestEndTime=$F_{end}$(T2.earliestStartTime, T2.endTimeDistribution, T2.timeslot, R)

T2.latestEndTime=$F_{end}$(T2.latestStartTime, T2.endTimeDistribution, T2.timeslot, R)

In FIG. 7, an example of a task duration distribution is depicted as a normal distribution. Here the end time of T1 is represented by a distribution starting from 9:16 (T1 is estimated to end at the earliest at 9:16), with a mean value at 10:00 (the mean point in a normal law is equal to the end time that we would get without the risk model) and with a latest value at 10:44. The end time of T2 is represented by a distribution starting from 10:47, with a mean value at 11:48 and with a latest value at 12:49. It can be seen that the T1 duration distribution is influencing the distribution of start times for T2; with T2's own variability being driven by and the end times for T2 is influenced by both the T2 duration distribution and the T2 start times distribution (which itself is a function of T1 distribution). We call this impacting mechanism from one task to the other scheduled task the risk propagation.

Figure 8:
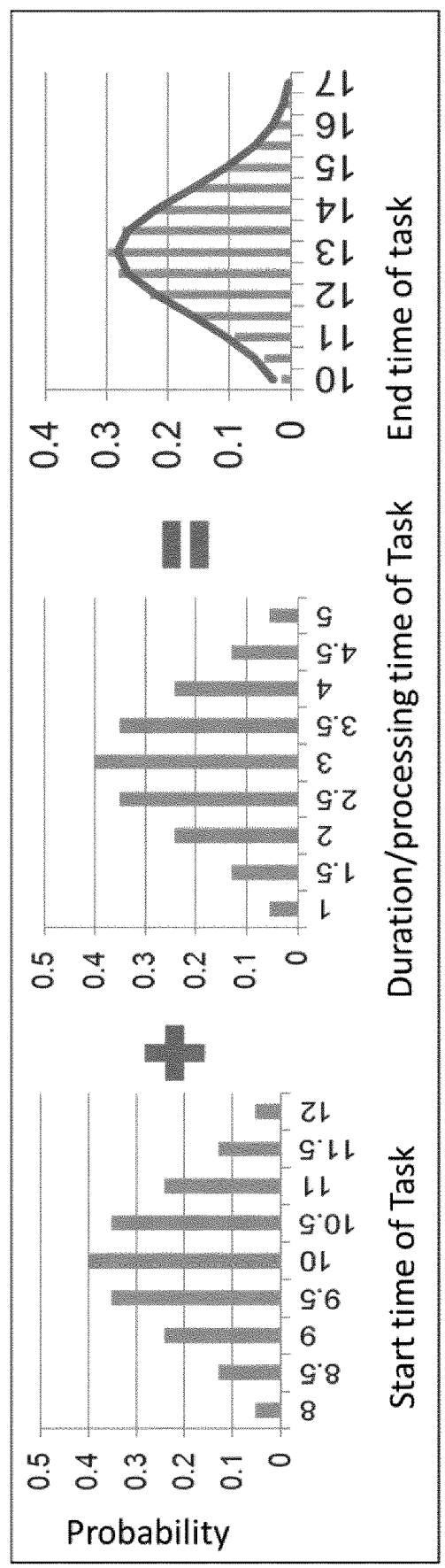
FIG. 8 depicts the summation of probabilities for a task executing in a virtual machine in an exemplary embodiment.

In FIG. 8, an example of an approximate mathematical method of propagation is illustrated. Assuming a task start-time and duration distributions can be described by N independent random variables Xi, where each Xi follows a Gamma law $\Gamma(ki, \theta)$ for i=1, 2, ..., N, then the end-time distribution can be obtained through a propagation of such distributions and is given by of the sum of Xi's which can be approximated as the Gamma function as follows:

$$\sum_{i=1}^{N} X_i \sim \Gamma\left(\sum_{i=1}^{N} k_i, \theta\right)$$

Figure 9:
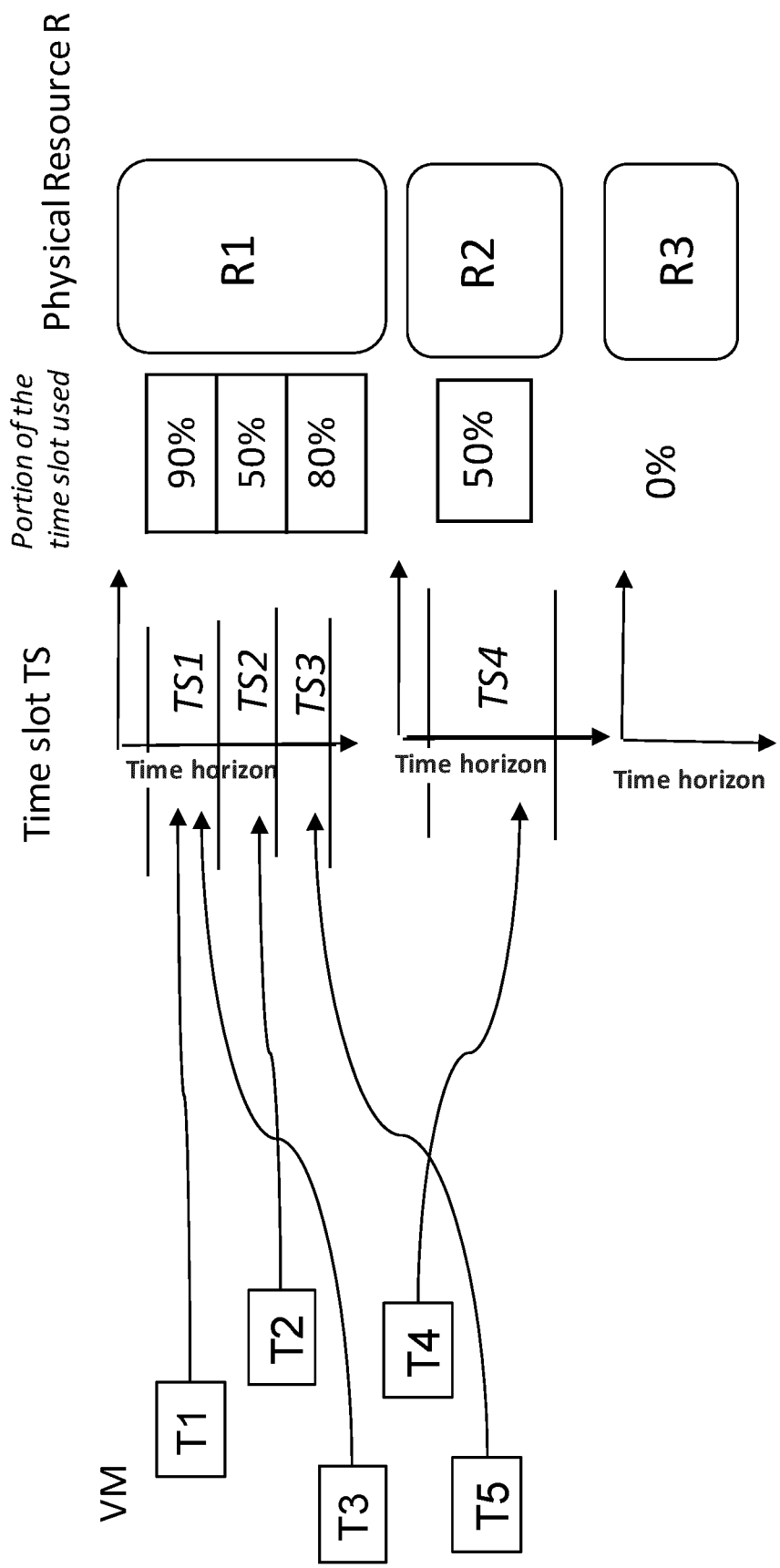
FIGS. 9, 10, 11, and 12 depict stages in an exemplary virtual machine schedule according to embodiments of the present disclosure.

FIGS. 9 to 12 provide an example that illustrates the technical effect of risk assessment while scheduling VMs within an optimizer for a cloud computing environment. At the start of the scheduling horizon FIG. 9, we have four tasks/VMs already planned to be processed and instantiated on given time slot. Exemplary risk estimates that the scheduler may have calculated for an entire day at a start of the scheduling horizon for FIG. 9 is given in table 1.

TABLE 1

Exemplary Risk Estimates

| Resource | Task VM | Risk of task (Equation (3)) |
|---|---|---|
| (R1, TS1) | T1 | 1% |
| (R1, TS1) | T3 | 40% |
| (R1, TS2) | T2 | 20% |
| (R1, TS3) | T5 | 25% |
| (R2, TS4) | T4 | 1% |
| R3 | Empty | |

The optimizer has scheduled the tasks to two physical resources R1 and R2 over the entire scheduling horizon. R1 is used over three time slots TS1, TS2 and TS3, where 90% of the available features are planned to be consumed on TS1, 50% planned to consume on TS2, and 80% planned on TS3. R2 is used over one time slot TS4 using 50% of resources. R3 has not had any VM allocated yet. Table 1 shows resource pair (Tasks, Time slot) and overall risks calculated by the scheduler with the aim of maintaining the risk for failing time or magnitude on T1 and T3 in TS1, and on T2 in TS2, and T5 on TS3 to lower than a threshold.

As considered earlier in (with respect to equation (1)), the overall cost is a trade-off between 3 items with a priority being balanced through weights: 1) Overall risk in R1 for the 5 tasks; 2) Overall workload completion time and 3) resource consumption over R1, R2, R3. R3 is left spare, minimizing the number of resources used while minimizing the risk of failing the tasks (satisfying item 3).

Figure 10:
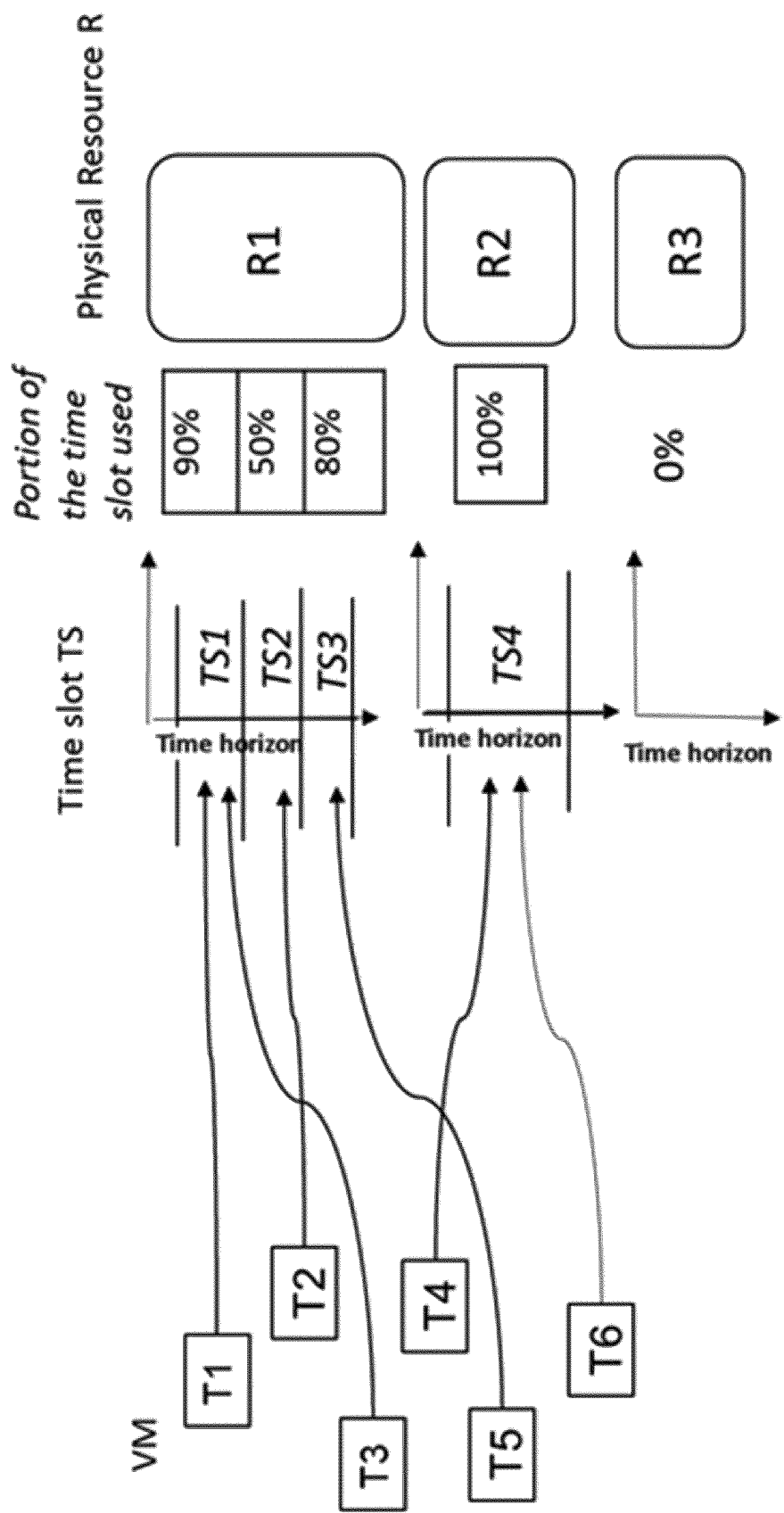
Figure 11:
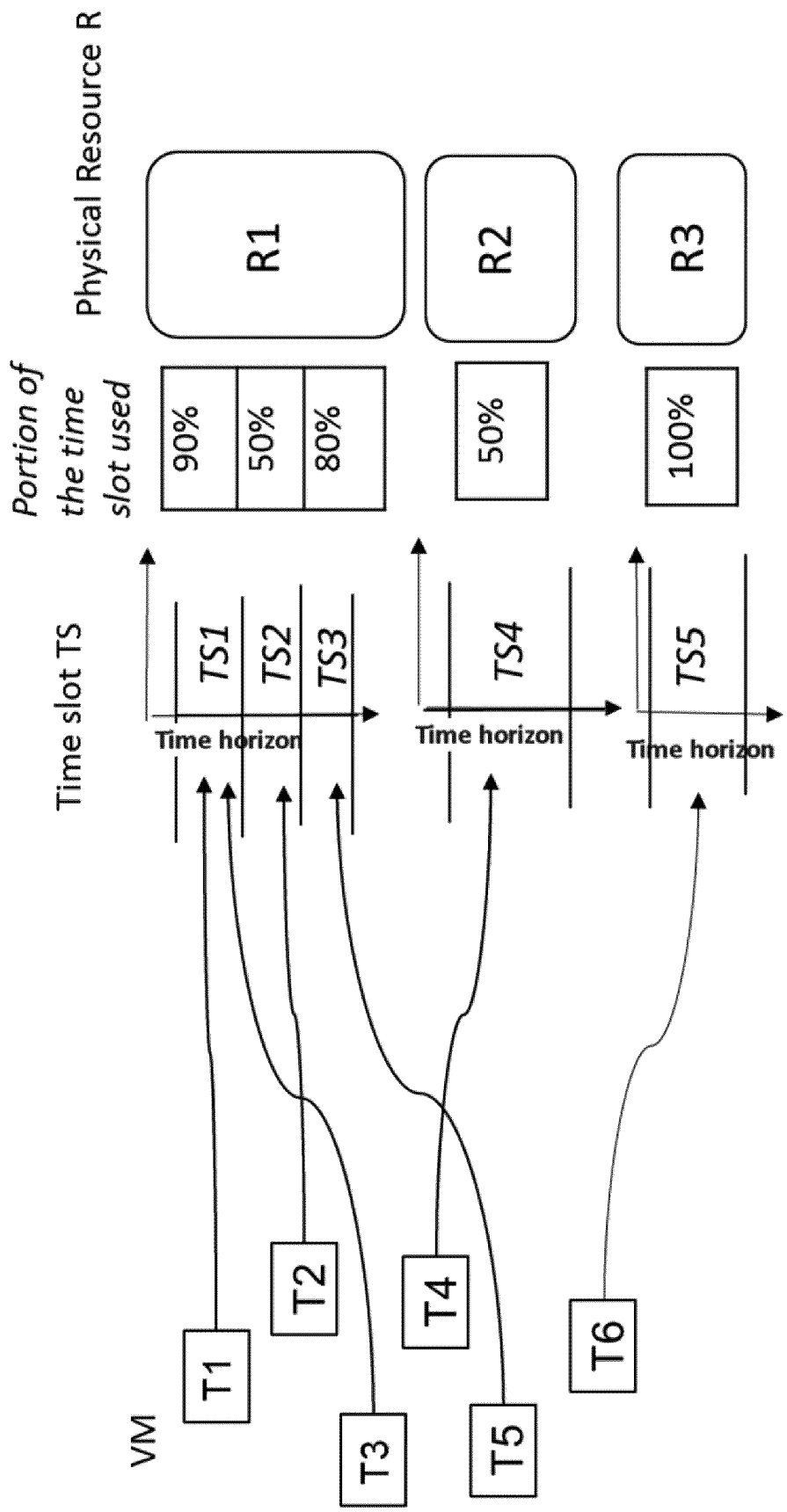
Figure 12:
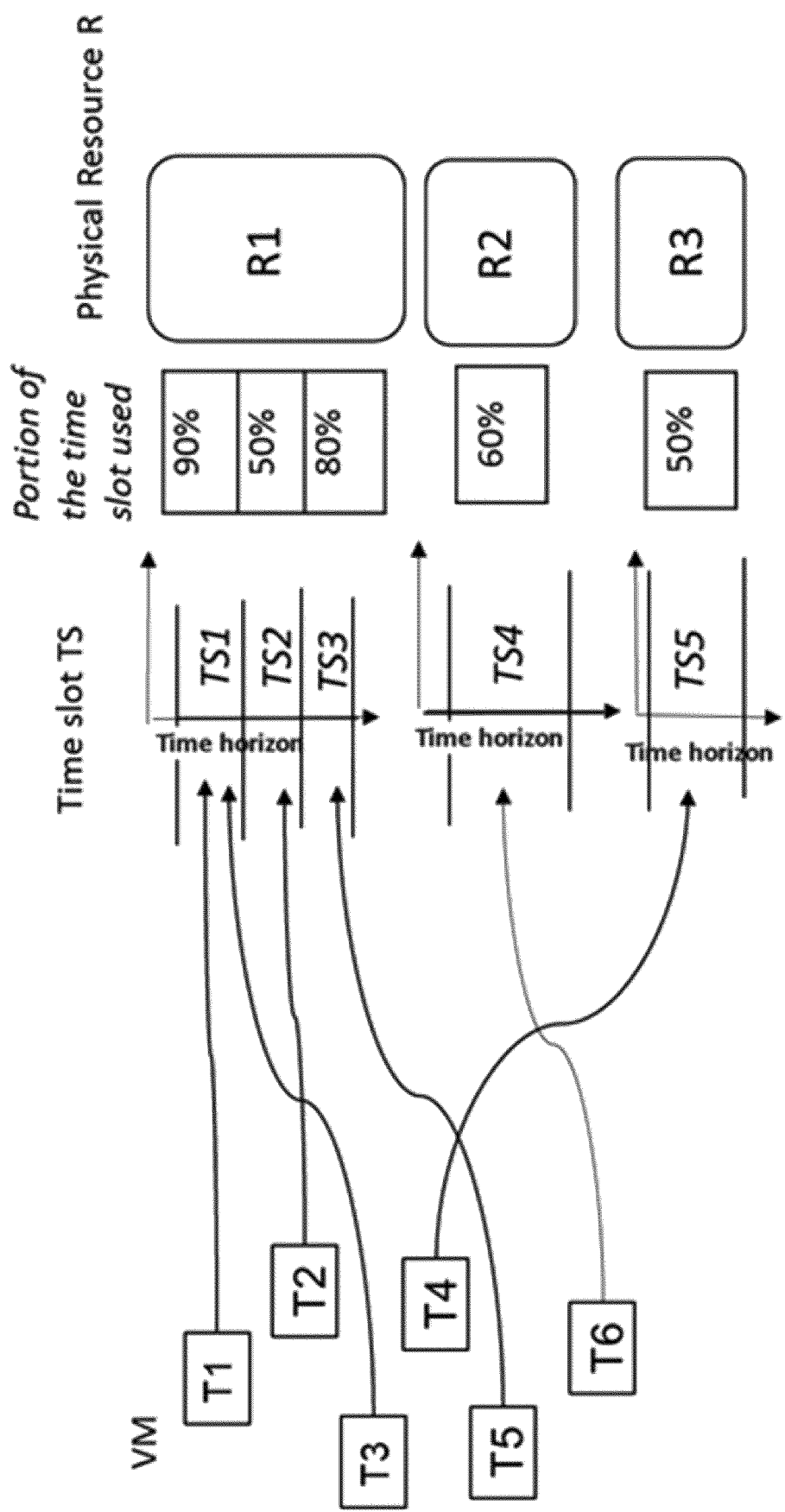

Assuming a first time in which the schedule needs to be rearranged is due to the arrival of a new task, T6, then the scheduler considers three possible options, depicted in FIGS. 10, 11 and 12. These three possible options can be made depending on the importance weights of the above three cost items:

Option 1: Schedule to R2: as depicted in FIG. 10 and based on the risks calculated as set out in Table 2.

TABLE 2

Calculated Risks for Option 1

| Resource | Task VM | Risk of task (Equation (3)) |
|---|---|---|
| (R1, TS1) | T1 | 1% |
| (R1, TS1) | T3 | 40% |
| (R1, TS2) | T2 | 20% |
| (R1, TS3) | T5 | 25% |
| (R2, TS4) | T4 | 1% |
| (R2, TS4) | T6 | 80% |
| R3 | Empty | |

Option 2: Schedule to R3: as depicted in FIG. 11 and based on the risks calculated as set out in Table 3.

TABLE 3

Calculated Risks for Option 2

| Resource | Task VM | Risk of task (Equation (3)) |
|---|---|---|
| (R1, TS1) | T1 | 1% |
| (R1, TS1) | T3 | 40% |
| (R1, TS2) | T2 | 20% |
| (R1, TS3) | T5 | 25% |
| (R2, TS4) | T4 | 1% |
| (R3, TS5) | T6 | 15% |

Option 3: Schedule to R1: as depicted in FIG. 12 and based on the risks calculated as set out in Table 4.

TABLE 4

Calculated Risks for Option 3

| Resource | Task VM | Risk of task (Equation (3)) |
|---|---|---|
| (R1, TS1) | T1 | 1% |
| (R1, TS1) | T3 | 40% |
| (R1, TS2) | T2 | 20% |
| (R1, TS3) | T5 | 25% |
| (R2, TS4) | T4 | 1% |
| (R3, TS5) | T6 | 1% |

Option 1 may be chosen if there is no risk trade-off and T6 can be performed on R2. Assuming T6 features and required (entire horizon) time slot fit into the capability and availability of R2, that is T6 will consume the 50% left time space on R2. The consumption of R2 is likely to vary above 100% and thus there is a significant likelihood for the completion of T6 to be delayed. The estimated risk of failure of T6 if instantiated on R2 reaches a high level of 80%.

Option 2: With Option 1, the magnitude (bandwidth for instance) required by T6 is so that the estimated risk of failure of T6 if instantiated on R2 reaches 80%, hence another option is explored i.e. R3. If R3 has enough bandwidth then T6 will be scheduled to R3, with a low risk of 15% say. However if R3 does not have enough bandwidth while R2 does, then the core optimizer may capture this while assessing the risk of assignment T6→R3, which will result to the assignment T6→R2 and may reschedule T4→R3. An alternative decision could be to reschedule T4→R1 but because T4 was previously planned the cost optimizer heuristics drive it to reschedule to a position where the risk is kept a low as possible (not higher than the risk of T4 when it was on R2).

Option 3 will be considered if there is risk of failing T6 on R2 and R3. However, since R1 is already busy with a plan of jobs, there is risk of causing some failure on the already planned tasks. Here the schedule will focus on minimizing risk over all tasks, possibly evaluating the re-arrangement of some of the earlier allocation. In this case the engine re-schedules T4→(R3, TS5) and T6→(R2, TS4) which minimizes the overall tasks' risks.

The schedule will thus decide on Option 3.

Figure 13:
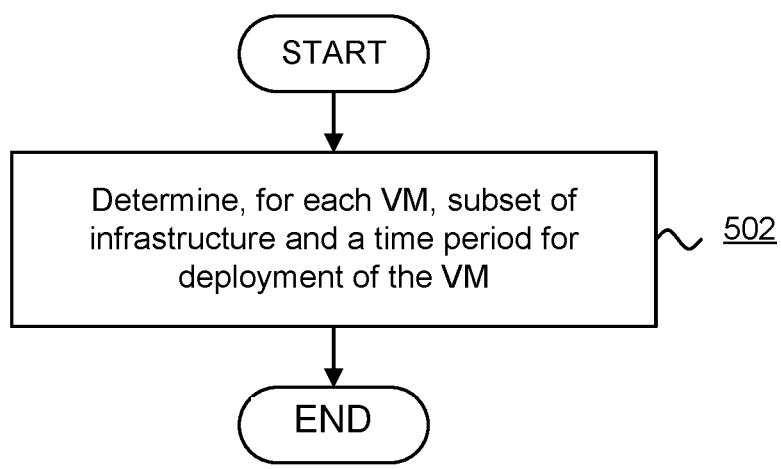
FIG. 13 is a flowchart of a method of scheduling a plurality of virtual machines for execution by a physical computing infrastructure according to embodiments of the present disclosure.

FIG. 13 is a flowchart of a method of scheduling a plurality of virtual machines for execution by a physical computing infrastructure according to embodiments of the present disclosure. Each virtual machine is deployable to a subset of the infrastructure to execute a computing task. At 502 the method determines a subset of the infrastructure and a time period for deployment of the virtual machine. In this way, the method schedules the virtual machines to execute to completion over an aggregate of all time periods. Notably, the determination is based on a mathematical optimization of a risk function for each of the virtual machines corresponding to a relative risk that a virtual machine will fail to fully execute its task to completion.

In one embodiment, the risk function is a function of a likelihood of failure of a task for a virtual machine and a relative impact of such failure. The likelihood of failure can be determined based on a probability that execution of the task will commence in accordance with the schedule, and based on a probability that execution of the task will complete in accordance with the schedule.

In one embodiment the mathematical optimization is arranged to minimize a quantity of resources in the physical computing infrastructure consumed to execute the virtual machines to completion over the aggregate time period.

Insofar as embodiments of the present disclosure are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of scheduling a plurality of virtual machines for execution by a physical computing infrastructure, each virtual machine configured to be deployed to a subset of the physical computing infrastructure to execute a computing task, the method comprising:

determining, for each virtual machine, a subset of the physical computing infrastructure and a time period for deployment of the virtual machine, so as to schedule the plurality of virtual machines to execute to completion over an aggregate of all time periods, wherein the determination is based on a mathematical optimization of a risk function for each of the plurality of virtual machines corresponding to a relative risk that at least one virtual machine will fail to fully execute its task to completion, wherein the risk function is a function of a likelihood of failure of a task for a virtual machine and a relative impact of such failure, wherein the likelihood of failure is determined based on a probability that execution of the task will commence in accordance with the schedule, and based on a probability that execution of the task will complete in accordance with the schedule.

2. The method of claim 1 wherein the mathematical optimization is further arranged to minimize a quantity of resources in the physical computing infrastructure consumed to execute the virtual machines to completion over the aggregate time period.

3. A computer system including a processor and memory storing computer program code for performing the steps of the method of claim 1.

4. A non-transitory computer-readable storage medium storing a computer program element comprising computer program code to, when loaded into a computer system and executed thereon, cause the computer system to perform the method as claimed in claim 1.

* * * * *